United States Patent
Mahr

(10) Patent No.: US 7,481,042 B2
(45) Date of Patent: Jan. 27, 2009

(54) DEVICE FOR PRODUCING A REDUCING AGENT/EXHAUST GAS MIXTURE AND EXHAUST GAS PURIFICATION SYSTEM

(75) Inventor: Bernd Mahr, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 1103 days.

(21) Appl. No.: 10/398,382

(22) PCT Filed: Oct. 2, 2001

(86) PCT No.: PCT/DE01/03786

§ 371 (c)(1),
(2), (4) Date: Apr. 4, 2003

(87) PCT Pub. No.: WO02/29219

PCT Pub. Date: Apr. 11, 2002

(65) Prior Publication Data
US 2005/0172615 A1    Aug. 11, 2005

(30) Foreign Application Priority Data
Oct. 4, 2000    (DE)    ................................ 100 48 921

(51) Int. Cl.
*F01N 3/00* (2006.01)
(52) U.S. Cl. .............................. 60/286; 60/295; 60/301; 60/303; 60/324; 239/432; 222/145.6

(58) Field of Classification Search .................. 60/280, 60/286, 295, 296, 301, 303, 309, 322, 324; 239/427, 432; 222/145.5, 145.6, 145.8
See application file for complete search history.

(56) References Cited

U.S. PATENT DOCUMENTS

| | | | | |
|---|---|---|---|---|
| 3,891,396 | A * | 6/1975 | Musall et al. | 422/179 |
| 5,209,062 | A * | 5/1993 | Vollenweider | 60/280 |
| 5,450,749 | A * | 9/1995 | Strom et al. | 73/114.72 |
| 5,758,497 | A * | 6/1998 | Frederiksen et al. | 60/299 |
| 6,516,610 | B2 * | 2/2003 | Hodgson | 60/286 |
| 6,722,123 | B2 * | 4/2004 | Liu et al. | 60/286 |
| 7,059,118 | B2 * | 6/2006 | Ripper et al. | 60/286 |
| 7,065,958 | B2 * | 6/2006 | Funk et al. | 60/286 |

FOREIGN PATENT DOCUMENTS

JP    08246850 A *    9/1996    ................. 60/286

* cited by examiner

*Primary Examiner*—Binh Q. Tran
(74) *Attorney, Agent, or Firm*—Ronald E. Greigg

(57) ABSTRACT

An apparatus for forming a mixture of reducing agent and exhaust gas, having a mixture-forming region into which an exhaust gas and a reducing agent can be introduced, wherein the wall of the mixture-forming region is embodied at least in part with protuberances and indentations, and in particular in corrugated fashion.

9 Claims, 1 Drawing Sheet

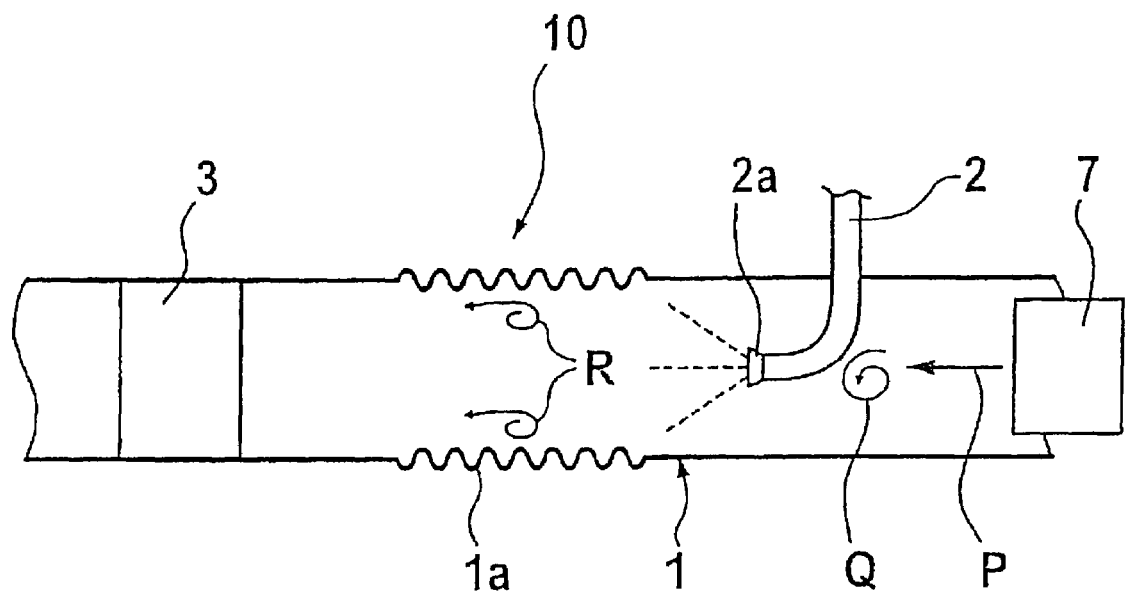

DEVICE FOR PRODUCING A REDUCING AGENT/EXHAUST GAS MIXTURE AND EXHAUST GAS PURIFICATION SYSTEM

CROSS-REFERENCE TO RELATED APPLICATIONS

This application is a 35 USC 371 application of PCT/DE 01/03786 filed on Oct. 2, 2001.

BACKGROUND OF THE INVENTION

1. Field of the Invention

The present invention relates to an apparatus for forming a mixture of reducing agent and exhaust gas and to an exhaust gas cleaning system using the apparatus.

2. Description of the Prior Art

Exhaust gas cleaning systems, particularly for reducing nitrogen oxides ($NO_x$) in the exhaust gas of Diesel engines, are known. One such exhaust gas cleaning system is described in German Patent DE 197 31 865 C2, for instance. A catalytic converter assembly used here has an oxidation catalytic converter, in which the NO present in the exhaust gas is first converted into $NO_2$. In a downstream reservoir component, the nitrogen oxides are then stored, for instance in the form of barium nitrate. In order to maintain the reservoir component so that it is functional over a long period, it is advantageous to regenerate it from time to time. For this regeneration, it is necessary to achieve so-called rich phases in the exhaust gas stream, that is, to subject the exhaust gas stream to a suitable reducing agent. The enrichment can be done for instance by mixing in fuel (HC). The rich phases can be accomplished within the engine in the lower rpm and load range. At higher rpm and torque levels, this can be achieved, without drawbacks, only with an external metering in of reducing agent, for instance. Postinjecting reducing agent at high injection pressures in the combustion chamber has the drawback of diluting the oil. Metering directly into the exhaust gas system through an injection nozzle and preheating the fuel, for instance with a spark plug, has so far not achieved satisfactory results, because the fuel temperature is too low and its preparation is inadequate.

It has proved to be disadvantageous that if reducing agents are overdosed, in an SCR catalytic converter, unwanted exhaust gas components occur. The occurrence of such byproducts is due among other factors also to incomplete aerosol formation of the reducing agent in the exhaust gas. It has been attempted in this respect to position mixers, such as so-called Sulzer mixers, in the exhaust gas system to improve the aerosol formation. However, since the volumetric flow of exhaust gas in the Diesel engine is highly dependent on the engine rpm and engine load, such mixers must be provided with controllable blades or swirl generators, and it is found that such controls are relatively complicated to produce and to maintain. On the other hand, with noncontrollable mixers, when flow velocities are high, demixing of reducing agent and exhaust gas can occur because too much swirl is created, so that the reducing agent is deposited onto the wall of the exhaust pipe.

OBJECTS AND SUMMARY OF THE INVENTION

One object of the invention is to create an apparatus with which an improvement in the formation of a mixture of reducing agent and exhaust gas in an exhaust gas cleaning system can be attained in a simple way.

According to the invention, an exhaust gas cleaning system is now made available which with simple means makes improved preparation of a mixture of reducing agent and exhaust gas possible, compared to conventional systems. The invention can be used in particular in conjunction with urea metering systems for SCR catalytic converters in Diesel engines. According to the invention, very good mixture preparation over a wide range of the Diesel engine performance graph is attainable, and this is especially significant for $NO_x$ storage-type catalytic converters. With this system, over the entire performance graph range, uniform mixing of the reducing agent in the exhaust system is achieved, and it is possible to dispense with an additional mixer or swirl generator that has the disadvantage of creating a high exhaust gas counterpressure. The apparatus of the invention is distinguished by being quite inexpensive to produce, and without requiring a complicated controller, it offers the possibility of a swirl or turbulence field that varies with the volumetric flow of exhaust gas. The apparatus and exhaust gas cleaning system of the invention are very compact.

In a preferred embodiment, the mixture-forming region is embodied as a tube that is at least in part a corrugated tube. A corrugated tube or corrugated tube region of this kind is easy to produce and acts in an effective way as a turbulence generator. The use of a corrugated tube also contributes effectively to decoupling vibration within the exhaust system.

Expediently, one end of the tube is positioned near an exhaust gas outlet of a turbine of an exhaust gas turbocharger. Such a turbine also generates a turbulence field, which advantageously cooperates with the further turbulence field created by the corrugated tube.

It is preferred that the delivery of reducing agent into the mixture-forming region take place by means of a spray tube embodied with a spray head. Such an arrangement can be positioned in a simple way at a desired position inside the mixture-forming region or the exhaust system.

BRIEF DESCRIPTION OF THE DRAWINGS

A preferred embodiment of the apparatus of the invention will be described in further detail herein below, in conjunction with the sole drawing figure which shows a schematic lateral sectional view of a preferred embodiment of the apparatus and exhaust gas cleaning system of the invention.

In the sole drawing figure, an exhaust gas cleaning system of the invention is identified overall by reference numeral 10. The system has a mixture-forming region, embodied as a tube 1, in which exhaust gas, whose flow direction is represented by the arrow P, from the turbine of an exhaust gas turbocharger 7 (shown purely schematically) is mixed with a reducing agent, which is introduced into the tube 1 via a spray tube 2. The spray tube 2 is expediently embodied with a spray head 2a, which accomplishes the distribution of the reducing agent over the widest possible space angle range, as indicated by the dashed lines. The spray head 2a, serving to prepare the stream of reducing agent emerging from the spray tube 2, is embodied as a single or multiple nozzle, for instance.

The mixture of reducing agent and exhaust gas thus formed is delivered to a downstream catalytic converter assembly 3, in which the desired exhaust gas posttreatment or cleaning then takes place. The catalytic converter assembly 3 can in particular include a deNOx catalytic converter, suitable for Diesel engines, such as an SCR catalytic converter, and in that case urea is expediently metered in as reducing agent via the spray tube 2. Other types of catalytic converters can also be used, but will not be addressed in further detail here.

For furnishing an optimal mixture of reducing agent and exhaust gas, a complete aerosol formation of the reducing agent after its emergence from the spray tube 2 (or spray head 2a) is sought. It in fact proves to be true that if the aerosol formation is incomplete, the resultant droplets are moved outward by centrifugal forces in the swirl field of the turbine of the exhaust gas. turbocharger 7 (as represented by the rotation arrow Q), or in other words are moved in the direction of the wall of the tube 1. It can then happen that reducing agent emerging from the tube, such as a urea and water solution as mentioned, will adhere to the wall of the tube without forming an aerosol. To compensate for this effect, the tube 1 is provided at least in part with a region embodied as a corrugated tube 1a. By means of this kind of corrugated tube region, further turbulence is created in the peripheral layer region of the tube, and this contributes to spinning off any reducing agent (such as urea and water solution) that has adhered to the wall and mix it with the exhaust gas flowing through the tube.

It should be noted that this effect is particularly advantageous when the volumetric flows of exhaust gas are great, since in that case the high exhaust gas velocity leads to a decrease in the penetration depth of the reducing agent aerosol that emerges from the spray tube 2. Because of the more-pronounced swirl or turbulence field made available according to the invention, this decrease in the penetration depth can be compensated for, so that in particular better mixing of the reducing agent with the exhaust gas occurs. The system presented according to the invention has the further advantage that it operates without significantly increasing the counter-pressure of the exhaust gas. For the sake of completeness, it should be noted that it is possible to generate a slight additional swirl with the aid of guide blades disposed in the tube 1.

Finally, it should be noted that the catalytic converter assembly 3 can also include a hydrolysis catalytic converter, which can form a unit with the mixture-forming region or can be disposed in the downstream region of the exhaust system, upstream of an SCR catalytic converter.

The foregoing relates to preferred exemplary embodiments of the invention, it being understood that other variants and embodiments thereof are possible within the spirit and scoupe of the invention, the latter being defined by the appended claims.

I claim:

1. An apparatus for forming a mixture of reducing agent and exhaust gas, comprising an elongated tube (1) having an exterior wall and a mixture-forming region (1a) formed exclusively by the exterior wall of the tube (1) into which region an exhaust gas and a reducing agent are introduced, the exterior wall of the tube forming the mixture-forming region (1a) being embodied, at least in part, with protuberances and indentations, a spray tube (2) for delivery of the reducing agent into the mixture-forming region (1a) of the tube (2), and a spray head (2a) on the spray tube (2), the spray head being positioned within the tube upstream of or within the mixture forming region.

2. The apparatus of claim 1, wherein one end of the tube (1) is operably connected to the exhaust gas outlet of a turbine (5a) of an exhaust gas turbocharger (5).

3. The apparatus of claim 1, wherein the spray head (2a) is positioned substantially centrally in the tube (1).

4. The apparatus of claim 2, wherein the spray head (2a) is positioned substantially centrally in the tube (1).

5. An exhaust gas cleaning system comprising a catalytic converter assembly (3) and an apparatus preceding the catalytic converter assembly for forming a mixture of reducing agent and exhaust gas, the apparatus for forming a mixture of reducing agent and exhaust gas including an elongated tube (1) having an exterior wall and a mixture-forming region (1a) formed exclusively by the exterior wall of the tube (1) into which region an exhaust gas and a reducing agent are introduced, the exterior wall of the tube forming the mixture-forming region (1a) being embodied, at least in part, with protuberances and indentations, a spray tube (2) for delivery of the reducing agent into the mixture-forming region (1a) of the tube (2), and a spray head (2a) on the spray tube (2), the spray head being positioned within the tube upstream of or within the mixture forming region.

6. The exhaust gas cleaning system, according to claim 5, wherein one end of the tube (1) is operably connected to the exhaust gas outlet of a turbine (5a) of an exhaust gas turbocharger (5).

7. The exhaust gas cleaning system according to claim 5, wherein the spray head (2a) is positioned substantially centrally in the tube (1).

8. The apparatus of claim 1, wherein the wall of the mixture-forming region (1a) is, at least in part, embodied in corrugated fashion.

9. The apparatus of claim 5, wherein the wall of the mixture-forming region (1a) is, at least in part, embodied in corrugated fashion.

* * * * *